US012649204B2

(12) United States Patent     (10) Patent No.:   US 12,649,204 B2
Bae et al.     (45) Date of Patent:    Jun. 9, 2026

(54) GAS SHIELD ARC WELDING WIRE

(71) Applicants: POSCO CO., LTD, Pohang-si (KR);
KISWEL LTD., Busan (KR)

(72) Inventors: Gyu-Yeol Bae, Incheon (KR);
Chang-Uk Song, Changwon-si (KR);
Su-Kyung Jung, Busan (KR)

(73) Assignees: POSCO CO., LTD, Pohang-si (KR);
KISWEL LTD., Busan (KR)

( * ) Notice: Subject to any disclaimer, the term of this
patent is extended or adjusted under 35
U.S.C. 154(b) by 0 days.

(21) Appl. No.: 18/995,322

(22) PCT Filed: Feb. 3, 2023

(86) PCT No.: PCT/KR2023/001607

§ 371 (c)(1),
(2) Date: Jan. 16, 2025

(87) PCT Pub. No.: WO2024/154850

PCT Pub. Date: Jul. 25, 2024

(65) Prior Publication Data

US 2025/0256361 A1     Aug. 14, 2025

(30) Foreign Application Priority Data

Jan. 18, 2023    (KR) .......................... 10-2023-007100

(51) Int. Cl.
B23K 35/30       (2006.01)
B23K 35/02       (2006.01)
(Continued)

(52) U.S. Cl.
CPC ...... B23K 35/3073 (2013.01); B23K 35/0261
(2013.01); C22C 38/002 (2013.01);
(Continued)

(58) Field of Classification Search
CPC ... B23K 35/3073; C22C 38/002; C22C 38/02;
C22C 38/04; C22C 38/06; C22C 38/42;
(Continued)

(56) References Cited

U.S. PATENT DOCUMENTS

2016/0032438 A1    2/2016   Hirata et al.
2019/0126409 A1    5/2019   Seo et al.
(Continued)

FOREIGN PATENT DOCUMENTS

CN      101909810 A    12/2010
CN      101992365 A    3/2011
(Continued)

OTHER PUBLICATIONS

International Search Report for PCT/KR2023/0016007, dated Oct.
17, 2023.
(Continued)

*Primary Examiner* — Katherine A Christy
(74) *Attorney, Agent, or Firm* — Sughrue Mion, PLLC

(57) ABSTRACT

A gas shield arc welding wire includes, by wt %, 0.001 to
0.30% of C; 0.25% or less of Si (excluding 0%); 0.50 to
3.00% of Mn; 0.030% or less of P (excluding 0%); 0.030%
of less of S (excluding 0%); 0.50% or less of Cr (excluding
0%); 0.60% or less of Mo (excluding 0%); less than 0.10%
of Al (excluding 0%); 0.40% or less of Ni (excluding 0%);
0.50% or less of Cu (excluding 0%); less than 0.10% of Ti
(excluding 0%); and the balance of Fe and other unavoidable
impurities, the wire satisfying relational expression 1, $2.0 \leq$
$[Si] \times 100/[Mn] \leq 5.2$, and relational expression 2, $[Ti]+$
$[Al] < 0.10$.

10 Claims, 2 Drawing Sheets

(51) Int. Cl.

| | |
|---|---|
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/50* | (2006.01) |
| *C22C 38/54* | (2006.01) |
| *C22C 38/58* | (2006.01) |
| *B23K 9/16* | (2006.01) |
| *B23K 101/34* | (2006.01) |

(52) U.S. Cl.
CPC .............. *C22C 38/02* (2013.01); *C22C 38/04* (2013.01); *C22C 38/06* (2013.01); *C22C 38/42* (2013.01); *C22C 38/44* (2013.01); *C22C 38/50* (2013.01); *C22C 38/54* (2013.01); *C22C 38/58* (2013.01); *B23K 9/16* (2013.01); *B23K 2101/34* (2018.08)

(58) Field of Classification Search
CPC ......... C22C 38/44; C22C 38/50; C22C 38/54; C22C 38/58
USPC ........................................................ 428/681
See application file for complete search history.

(56) References Cited

U.S. PATENT DOCUMENTS

| | | |
|---|---|---|
| 2019/0352749 A1 | 11/2019 | Nakashima et al. |
| 2020/0392611 A1 | 12/2020 | Jotoku et al. |
| 2021/0086313 A1 | 3/2021 | Kodama et al. |
| 2021/0138591 A1 | 5/2021 | Ikai et al. |
| 2022/0154319 A1 | 5/2022 | Otsuka et al. |
| 2022/0331915 A1 | 10/2022 | Kinashi et al. |

FOREIGN PATENT DOCUMENTS

| | | |
|---|---|---|
| CN | 102019516 A | 4/2011 |
| CN | 102717206 A | 10/2012 |
| CN | 102744529 A | 10/2012 |
| CN | 103846571 A | 6/2014 |
| CN | 103862191 A | 6/2014 |
| CN | 104227264 A | 12/2014 |
| CN | 105728978 A | 7/2016 |
| CN | 109689912 A | 4/2019 |
| CN | 109719416 A | 5/2019 |
| CN | 110614457 A | 12/2019 |
| CN | 111771007 A | 10/2020 |
| CN | 111886110 A | 11/2020 |
| EP | 3 778 111 A1 | 2/2021 |
| JP | 63-194889 A | 8/1988 |
| JP | 3-81072 A | 4/1991 |
| JP | 3-204195 A | 9/1991 |
| JP | 2009-166066 A | 7/2009 |
| JP | 5623413 B2 | 11/2014 |
| JP | 2019-81195 A | 5/2019 |
| JP | 2019-107697 A | 7/2019 |
| JP | 2019-118274 A | 7/2019 |
| JP | 2021-003717 A | 1/2021 |
| JP | 2021-003732 A | 1/2021 |
| JP | 2022-123373 A | 8/2022 |
| KR | 10-2007-0108558 A | 11/2007 |
| KR | 10-2015-0133838 A | 11/2015 |
| KR | 10-2019-0047388 A | 5/2019 |
| KR | 10-2020-0071772 A | 6/2020 |
| KR | 10-2021-0107596 A | 9/2021 |
| KR | 10-2021-0133279 A | 11/2021 |
| KR | 10-2022-0038463 A | 3/2022 |
| KR | 10-2022-0064409 A | 5/2022 |
| WO | 2009/082162 A2 | 7/2009 |
| WO | 2011/037272 A1 | 3/2011 |
| WO | 2015/068443 A1 | 5/2015 |

OTHER PUBLICATIONS

Office Action issued May 27, 2025 in Chinese Patent Application No. 202380024546.8.

Communication issued Aug. 12, 2025 in Japanese Application No. 2025-502804.

Communication dated Mar. 17, 2026 issued by the State Intellectual Property Office of P.R. China in application o. 202380024546.8.

GAS SHIELD ARC WELDING WIRE

CROSS REFERENCE TO RELATED APPLICATIONS

This application is a National Stage of International Application No. PCI/KR2023/001607 filed Feb. 3, 2023, claiming priority based on Korean Patent Application No. 10-2023-0007100 filed Jan. 18, 2023, the entire disclosures of which are incorporated herein by reference.

TECHNICAL FIELD

The present disclosure relates to a gas shielded arc welding wire, and more specifically, to a gas shielded arc welding wire not only having excellent strength and porosity in a weld zone, but also for securing economic efficiency essential for manufacturing parts.

BACKGROUND ART

In the automobile industry, research into lightweight technology for car bodies and parts is emerging as a major issue due to fuel efficiency regulations for environmental protection, such as global warming issues. Chassis parts, which are important to automobile driving performance, also need to use a high-strength steel material to reduce weight in line with this trend.

In order to achieve the weight reduction of such parts, high strength of the material is essential, and in an environment in which repeated fatigue loads are applied, ensuring durability of parts formed of a high-strength steel material may be an important factor.

However, in the case of arc welding, which is mainly used to secure strength when assembling automobile chassis parts, overlap joint welding between the parts is performed by welding of a welding wire, so it is inevitable to impart a geometric shape to a joint portion. This acts as a repeated fatigue stress concentration portion (notch effect) and becomes a fracture initiation point, which may ultimately lead to a decrease in the durability of the part, so there may be a limitation that the advantage of applying a high-strength steel material is lost.

Therefore, in order to improve fatigue characteristics of the weld zone, it is most important to reduce an angle (a toe angle) of a bead end, which is a main stress concentration portion. In addition, controlling a material and stress of a toe portion is also an important factor. In addition, as described above, due to the trend toward high strength and weight reduction of the parts, demand for rust prevention to prevent penetrating corrosion as the material is thinned, the adoption of a plated steel material is increasing, but in particular, a welding metal in an arc weld zone has limitations in that corrosion resistance after painting is inferior to that of a base material because there is no plating layer. Accordingly, there is a problem of early corrosion of a weld zone of chassis parts made of a plated steel sheet in harsh corrosive environments when driving a car, leading to deterioration in fatigue characteristics. Meanwhile, during gas shielded arc welding of the plated steel material, a large number of pore defects in the form of pits and blowholes may occur in a weld bead due to the generation of vapor such as zinc, or the like, so that there is a concern that the strength of the weld zone may be reduced and as a result, which may cause a problem of reduced welding productivity. In addition, in the case of a general unplated steel material, slag generated in the weld bead during gas shielded arc welding may cause poor painting defects, which may reduce corrosion resistance after painting. Therefore, there may be a problem in that the cost may increase due to post-processing processes such as picking or brushing, to remove the slag after welding when manufacturing parts.

Recently, the development of lightweight chassis parts for next-generation eco-friendly vehicles is actively being performed, and in particular, the development of welding technology that can improve the characteristics of a weld zone while ensuring economic feasibility is becoming an important issue.

PRIOR ART DOCUMENT

Patent Document (Patent Document 1) Japanese Patent Publication No. 2019-118274

SUMMARY OF INVENTION

Technical Problem

An aspect of the present disclosure is to provide a gas shielded arc welding wire having excellent strength and porosity in a weld zone that can secure excellent strength and porosity of a welding metal in the automobile industry.

An object of the present disclosure is not limited to the above description. The object of the present disclosure will be understood from the entire content of the present specification, and a person skilled in the art to which the present disclosure pertains will understand an additional object of the present disclosure without difficulty.

Solution to Problem

Therefore, according to an aspect of the present disclosure, a gas shielded arc welding wire is provided, the gas shielded arc welding wire including by weight %: 0.001 to 0.30% of C; 0.25% or less of Si (excluding 0%); 0.50 to 3.00% of Mn; 0.030% or less of P (excluding 0%); 0.030% or less of S (excluding 0%); 0.50% or less of Cr (excluding 0%); 0.60% or less of Mo (excluding 0%); less than 0.10% of Al (excluding 0%); 0.40% or less of Ni (excluding 0%); 0.50% or less of Cu (excluding 0%); less than 0.10% of Ti (excluding 0%), with a balance of Fe and other unavoidable impurities, the wire satisfying Relational expression 1 and Relational expression 2.

$$2.0 \leq [Si] \times 100/[Mn] \leq 5.2 \qquad \text{[Relational expression 1]}$$

$$[Ti] + [Al] < 0.10 \qquad \text{[Relational expression 2]}$$

in Relational expression 1 and Relational expression 2 above, [Si], [Mn], [Ti], and [Al] represent a weight percent content of each element in parentheses for a welding wire.

The welding wire may include Si in the range of 0.05 to 0.09%.

The welding wire may further include at least one of 0.10% or less of Nb, 0.10% or less of V, and 0.10% or less of Zr.

The welding wire may further include 0.01% or less of B.

The welding wire may be a solid wire, a metal cored wire, or a flux cored wire.

In addition, according to another aspect of the present disclosure, a welding metal obtained by welding a welding base material using the welding wire of claim 1 is provided, wherein the welding metal may have a length fraction occupied by pore defects of 10% or less (including 0%), with respect to the entire length of the welding metal.

Advantageous Effects of Invention

As set forth above, according to the present disclosure described above, it is possible to effectively provide a gas shielded arc welding wire having excellent strength and porosity in a weld zone, as a next-generation welding technology that has secured performance/cost competitiveness in line with the era of popularization of electric vehicles.

BEST MODE FOR INVENTION

Figure 1:
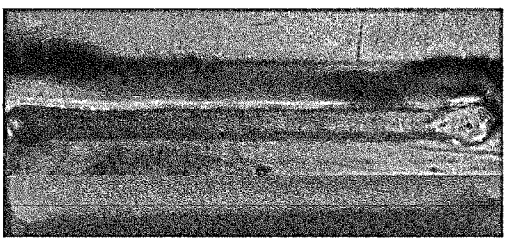
FIG. 1 is a photograph illustrating the appearance of a weld bead and the results of an X-ray analysis when forming welding metal using the welding wire in Inventive Example 1 in an embodiment of the present disclosure.

Hereinafter, the present disclosure will be described.

There is a problem in which pore defects occur in a weld zone due to the generation of zinc vapor when welding a galvanized steel sheet. In this case, if a content of Si, which is a deoxidizer among wire components, is lowered to a certain level or more, the viscosity of molten metal is lowered, which facilitates the discharge of zinc vapor, and as O (oxygen) generated by the dissociation of $CO_2$ in the protective gas at high temperatures during welding reacts more actively with Zn in the plating layer to form Zn-based oxides, zinc vapor pressure may be effectively lowered to stabilize an arc and suppress the occurrence of pore defects. However, the inventors of the present disclosure have confirmed through research results that when Ti or Al, which are strong deoxidizers among the wire components, are contained in a certain amount or more, the oxidation reaction of Zn is inhibited, causing arc instability, an increase in pore defects, and reduced strength in the weld zone. In particular, when the Ti+Al value is 0.10% or more, it was confirmed that the increase in pore defects was significant, and thus it was impossible to secure welding metal having excellent strength and porosity in the weld zone.

According to an aspect of the present disclosure, a gas shielded arc welding wire includes by weight %: 0.001 to 0.30% of C; 0.25% or less of Si (excluding 0%); 0.50 to 3.00% of Mn; 0.030% or less of P (excluding 0%); 0.030% of less of S (excluding 0%); 0.50% or less of Cr (excluding 0%); 0.60% or less of Mo (excluding 0%); less than 0.10% of Al (excluding 0%); 0.40% or less of Ni (excluding 0%); 0.50% or less of Cu (excluding 0%); less than 0.10% of Ti (excluding 0%), with a balance of Fe and other unavoidable impurities, the wire satisfying Relational expression 1 and Relational expression 2.

$$2.0 \leq [Si] \times 100/[Mn] \leq 5.2 \qquad \text{[Relational expression 1]}$$

$$[Ti] + [Al] < 0.10 \qquad \text{[Relational expression 2]}$$

Hereinafter, a gas shielded arc welding wire according to an embodiment of the present disclosure will be described. First, in the wire of the present disclosure, the reasons for adding each component and the reasons for limiting the content thereof are explained in detail. It should be noted that the content of each component described below is based on weight % unless specifically stated.

Carbon (C): 0.001 to 0.30%

Carbon (C) is an element which is advantageous in stabilizing an arc and atomizing a molten droplet thereof, and is also advantageous in securing hardenability. When the content of C is less than 0.001%, there may be a disadvantage in that the molten droplet may become coarse and the arc may become unstable, an amount of spatter generated may increase, and it may be difficult to secure sufficient strength of a welding metal. When the C content exceeds 0.30%, there may be a disadvantage in that the viscosity of molten metal may decrease, resulting in a poor bead shape, and the welding metal may be excessively hardened, resulting in reduced toughness.

Silicon (Si): 0.25% or Less (Excluding 0%)

Silicon (Si) is an element promoting deoxidation of molten metal during arc welding (a deoxidizing element), and is an element which is advantageous in suppressing the occurrence of blowholes. However, when welding a galvanized steel sheet, a Si content may be lowered to promote oxidation of Zn and lower zinc vapor pressure to prevent the occurrence of pore defects in a weld zone. In addition, by lowering the Si content, arc force may be strengthened by reducing resistivity of the wire, which can promote the discharge of zinc vapor from the molten metal directly below the arc. Meanwhile, when the Si content exceeds 0.25%, a large amount of non-conductive slag may be generated, which may cause coating defects in the weld zone, and excessive deoxidation may result in insufficient surface activation of the weld zone, which may reduce the penetrability of molten metal. Therefore, in the present disclosure, the Si content is preferably controlled to be 0.25% or less.

More preferably, the Si content is controlled to be in the range of 0.05 to 0.09%. when the Si content is too low, the deoxidation effect becomes insufficient, which may easily cause blowholes to occur.

Manganese (Mn): 0.5 to 3.0%

Manganese (Mn) is a deoxidizing element and is an element which is advantageous in suppressing the occurrence of blowholes by promoting deoxidation of molten metal during arc welding. When the Mn content is less than 0.5%, a deoxidation effect may be insufficient, which may make blowholes easy to occur. However, when welding a galvanized steel sheet, when the Mn content is excessively high, oxidation of Zn may be hindered and zinc vapor pressure increased, which may promote arc instability and the occurrence of pore defects in the weld zone. Meanwhile, when the Mn content exceeds 3.0%, when the viscosity of molten metal becomes excessively high and a welding speed is high, the molten metal cannot properly flow into a welded portion, so a humping bead may be formed so that it may be easy for bead shape defects. More preferably, the Mn content is limited to be 2.5% or less.

Chromium (Cr): 0.50% or Less (Excluding 0%)

Chromium (Cr) is a ferrite stabilizing element, and is an element which is advantageous in securing hardenability of improving the strength of welding metal. When the Cr content exceeds 0.50%, there may be a disadvantage in that the brittleness of welding metal may increase unnecessarily and it may be difficult to secure sufficient toughness. The Cr content is more preferably 0.30% or less, even more preferably 0.20% or less, and most preferably 0.10% or less.

Molybdenum (Mo): 0.60% or Less (Excluding 0%)

Molybdenum (Mo) is a ferrite stabilizing element, and is an element which is advantageous in securing hardenability for improving the strength of welding metal. When the Mn content exceeds 0.60%, there may be a disadvantage in that the toughness of welding metal is reduced in some cases.

Phosphorous (P): 0.030% or Less (Excluding 0%)

Phosphorous (P) is an element which is generally mixed as an inevitable impurity in steel, and is also an element which is included in an arc welding solid wire as a common impurity. When the P content exceeds 0.030%, there may be a disadvantage in that high-temperature cracking of welding metal becomes significant.

Sulfur(S): 0.030% or Less (Excluding 0%)

Sulfur(S) is an element which is generally mixed as an inevitable impurity in steel, and is also an element which is included in an arc welding solid wire as a common impurity. When the S content exceeds 0.030%, the toughness of welding metal deteriorates in some cases, and the surface tension of molten metal becomes insufficient during welding, causing a molten portion to flow excessively due to gravity during high-speed vertical welding (welding from top to bottom when performing vertical welding), resulting in a poor weld bead shape.

Aluminum (Al): 0.10% or Less (Excluding 0%)

Aluminum (Al) is a deoxidizing element that can improve the strength of welding metal by promoting the deoxidation of molten metal during arc welding even in a small amount of Al. To secure the above-described effect, 0% is excluded as a lower limit of the Al content. However, due to the deoxidization effect of Al, it can hinder the oxidation reaction of Zn during welding of a galvanized steel sheet, which can promote the occurrence of pore defects in a weld zone due to an increase in zinc vapor pressure and arc instability. When the Al content is 0.10% or more, the formation of Al-based oxides increases, and in some cases, the strength and toughness of welding metal may decrease and there may be a disadvantage in that the weld zone becomes susceptible to electrodeposition coating defects due to non-conductive oxides.

Titanium (Ti): 0.10% or Less (Excluding 0%)

Titanium (Ti) is a deoxidizing element that can improve the strength of welding metal by promoting the deoxidation of molten metal during arc welding even in a small amount of Ti. Ti also facilitates the development of acicular ferrite, which can improve the toughness of a weld zone. To ensure the above-described effect, 0% is excluded as a lower limit of Ti content. However, due to the deoxidization effect of Ti, it can hinder the oxidation reaction of Zn during welding of a galvanized steel sheet, which can promote the occurrence of pore defects in the weld zone due to an increase in zinc vapor pressure and arc instability. When the Ti content is 0.10% or more, the formation of Ti-based oxides increases, and there may be a disadvantage in that the strength and toughness of welding metal decreases in some cases due to the increased formation of Ti-based oxides.

Nickel (Ni): 0.40% or Less

Nickel (Ni) is an element that can improve the strength and toughness of welding metal. To ensure the above-described effect, 0% is excluded as a lower limit of Ni content. However, when the Ni content exceeds 0.40%, there may be a disadvantage of becoming sensitive to cracking, so the Ni content is set to 0.40% or less. The Ni content is more preferably 0.30% or less, more preferably 0.20% or less, and most preferably 0.10% or less.

Copper (Cu): 0.50% or Less (Including 0%)

Copper (Cu) is an element which is usually contained as an impurity in steel forming a wire, usually contained in an amount of around 0.02%. In the case of a solid wire for arc welding, a Cu content may be determined mainly due to copper plating applied to a surface of the wire. Copper (Cu) is an element that can stabilize the feedability and electrical conductivity of the wire. However, when the Cu content exceeds 0.50%, there may be a disadvantage in that the cracking susceptibility of welding metal may increase. The Cu content is more preferably 0.45% or less, more preferably 0.40% or less, and most preferably 0.30% or less.

The welding wire of the present disclosure may optionally further include at least one of 0.10% or less of Nb, 0.10% or less of V, and 0.10% or less of Zr.

Niobium (Nb): 0.10% or Less

Niobium (Nb) is an element that can improve the strength and toughness of welding metal by increasing hardenability and densifying the microstructure. In addition, Nb has an effect of improving a flow of molten metal and stabilizing arc during arc welding. However, when the Nb content exceeds 0.10%, there may be a disadvantage in that a low-melting point compound is formed at a grain boundary, making high-temperature cracking more likely to occur.

Vanadium (V): 0.10% or Less

Vanadium (V) is an element that can improve the strength and toughness of welding metal by increasing hardenability and densifying the microstructure. In addition, V is also a precipitation strengthening element that can improve the strength of welding metal by generating a carbonitride. However, when the V content exceeds 0.10%, there may be a disadvantage in that the toughness of welding metal is lowered in some cases due to the excessive strength due to the excessive precipitates. Therefore, the V content is set to 0.10% or less. Meanwhile, although not particularly limited, in terms of further improving the above-described effect, a lower limit of the V content may be 0.001%, or an upper limit of the V content may be 0.15% or 0.10%.

Zirconium (Zr): 0.10% or Less

Zirconium (Zr) is an element promoting deoxidation of molten metal during arc welding (a deoxidizing element), and is an element which is advantageous in suppressing the occurrence of blowholes. However, when the Zr content exceeds 0.10%, there may be a disadvantage in that electrodeposition coating properties of a weld zone deteriorates. Therefore, the Zr content is set to be 0.10% or less.

In addition, the welding wire of the present disclosure may optionally further include 0.01% or less of B.

Boron (B): 0.01% or Less

Boron (B) is an element that can improve the strength of welding metal by increasing hardenability thereof. However, when the content of B exceeds 0.01%, there may be a disadvantage in that the toughness of welding metal may deteriorate in some cases due to excessive hardenability. Therefore, the B content is set to be 0.01% or less.

The remaining component of the present disclosure is iron (Fe). However, since in the common manufacturing process, unintended impurities may be inevitably mixed from raw materials or the surrounding environment, the component may not be excluded. Since these impurities are known to any person skilled in the common manufacturing process, the entire contents thereof are not particularly mentioned in the present specification.

Meanwhile, the welding wire of the present disclosure includes Mn and Si so as to satisfy the following Relational expression 1. By satisfying the following Relational expression 1, the strength and porosity of welding metal described above may be improved. If a value defined by the Relational expression 1 is less than 2.0, the deoxidation effect of welding metal is insufficient, which may cause a problem of insufficient strength due to reduced porosity, and if the value defined by the Relational expression 1 exceeds 5.2, not only can the viscosity of welding metal increase, but also the zinc vapor pressure during welding may increase according to the above-described principle, which may result in arc instability and reduced porosity, resulting in insufficient strength. In addition, the problem of poor electrodeposition coating properties may occur due to an increase in the Si-based non-conductive oxides.

$$2.0 \leq [Si] \times 100/[Mn] \leq 5.2 \qquad \text{[Relational expression 1]}$$

In Relational expression 1 and Relational expression 2 above, [Si], [Mn], [Ti], and [Al] represent a weight percent content of each element in parentheses for a welding wire.

In addition, the welding wire of the present disclosure is required to contain Ti and Al so as to satisfy the following Relational expression 2.

When welding a galvanized steel sheet, pore defects may occur in the weld zone due to the generation of zinc vapor, and in this case, if the content of Si, a deoxidizer among wire components, is lowered to a certain level or more, the viscosity of molten metal may decrease, making the discharge of zinc vapor easier, and O (oxygen) generated by the dissociation of $CO_2$ in the protective gas at high temperatures reacts more actively with Zn in the plating layer to form Zn-based oxides, which may effectively lower the zinc vapor pressure, stabilize the arc, and suppress the occurrence of pore defects. However, when Ti or Al, which are strong deoxidizers among the wire components, are contained in a certain amount or more, the oxidation reaction of Zn is inhibited, causing arc instability, an increase in pore defects, and a decrease in the strength in the weld zone even at a low Si content. In particular, when the Ti+Al value is 0.10% or more, the increase in pore defects is evident, making it impossible to secure a welding metal having excellent strength and porosity of the weld zone.

$$[Ti] + [Al] < 0.10 \qquad \text{[Relational expression 2]}$$

In Relational expression 2 above, [Ti] and [Al] represent a weight percent content of each element in parentheses for a welding wire.

Meanwhile, in the present disclosure, the welding wire may be a solid wire, a metal cored wire, or a flux cored wire, and is not limited to a specific wire type.

In addition, in the present disclosure, as a welding metal obtained by welding a welding base material using the welding wire of the present disclosure having the composition components described above, the welding metal may satisfy a length fraction occupied by pore defects of 10% or less (including 0%), with respect to the entire length of the welding metal.

In this case, in the present disclosure, the welding base material is a hot-dip galvanized steel sheet having a hot-dip galvanized layer formed on the surface, and it is preferable that a thickness of the hot-dip galvanized layer is 2 to 20 μm and a single-sided plating amount is 5 to 120 $g/m^2$.

In addition, the present disclosure is not limited to the composition of the welding base material, and for example, the welding base material may include, by wt %, 0.04 to 0.18% of C, 2.0% or less (including 0%) of Si, 0.5 to 3.0% of Mn, 2.0% or less (including 0%) of Cr, 2.0% or less (including 0%) of Mo, 0.01 to 0.1% of Al, 0.05% or less (excluding 0%) of P, and 0.05% or less (excluding 0%) of S, with a balance of Fe and other unavoidable impurities.

The welding base material may optionally further include at least one of 0.2% or less of Ti, 0.1% or less of Nb, and 0.1% or less of Cu.

In addition, the welding base material may have a thickness of 0.8 to 4.0 mm.

Meanwhile, in the present disclosure, the type of shielding gas used for welding the welding base material is not particularly limited, and 100% $CO_2$ gas, Ar+20$CO_2$ gas, Ar+10% $CO_2$ gas, Ar+5% $CO_2$ gas, Ar+2% $O_2$ gas, and the like, may be used as shielding gas. In particular, when Ar+5 to 20% $CO_2$ is used as shielding gas, the remarkable effect of the present disclosure may be exhibited. That is, in order to secure a tensile strength in the weld zone without the occurrence of welding metal or fracture of a melting line in the present disclosure, it is preferable to use 5 to 20% $CO_2$ mixed with Ar as a protective gas during the welding.

Mode for Invention

Hereinafter, the present disclosure will be specifically described through the following Examples. However, it should be noted that the following examples are only for describing the present disclosure by illustration, and not intended to limit the right scope of the present disclosure. The reason is that the right scope of the present disclosure is determined by the matters described in the claims and reasonably inferred therefrom.

Example

Two sheets of base materials of a hot-dip galvanized steel sheets having an alloy composition as shown Table 1 below were prepared, the base material of the hot-dip galvanized steel sheet having a tensile strength of 540 MPa has a thickness of 2.0 mm, a length of 200 mm, a width of 150 mm, a single-sided coating weight of 85 $g/m^2$. A gas shielded arc welding solid wire having an alloy composition as shown Table 2 below was prepared.

Next, the hot-dip galvanized steel sheet was overlap joint welded using each of the welding solid wires prepared as described above. In this case, as a method, Pulse DC (protective gas: Ar+10~20% $CO_2$) was used, and a flow rate of shielding gas was 20l/min, an angle of a welding torch was 45° with respect to a vertical direction of the base material, a wire protrusion length was 15 mm, and welding current/voltage/speed conditions were 200 A-20 V-80 cm/min. In addition, a gap of an overlap joint portion was set to 0 mm, and a length of the overlap joint portion was set to 10 mm.

Meanwhile, welding was initiated at a position 10 mm from a starting point of the welding base material in a longitudinal direction, and after welding was performed for a length of 180 mm, welding was terminated at the position of 10 mm from an end point on an opposite side to the welding start position.

For each weld zone formed by the welding, a porosity was measured and the results thereof are shown in Table 3 below. In this case, a specific method of measuring a porosity is as follows. By irradiating the welding specimen manufactured as above, with X-rays, a length of each pore distributed in a weld zone was measured, and the porosity of the weld zone was calculated by dividing the sum of the lengths of each of the pores by the total length of the weld zone. In this case, a section corresponding to 10 mm from the starting point and the end point of the weld zone was excluded from the measurement, and the porosity was taken as an average value of the measured values of three welding specimens.

In addition, a tensile test was performed on the formed weld zone, and a position at which fracture occurred was observed with the naked eye, and in this case, if a welding base material or a heat-affected zone is fractured, it was evaluated as pass (O), and if a welding metal is fractured, it was evaluated as fail (X). A specific tensile test method herein is as follows. From each of the welding specimens manufactured above, a tensile specimen having a width of 30 mm and a length of 250 mm were processed, and a uniaxial tensile test was performed at a speed of 10 mm/min, and then a fracture position was investigated. In this case, the tensile test results were verified for reproducibility by evaluating three welding specimens.

TABLE 1

| | Alloy composition of base material (weight %) | | | | | | |
|---|---|---|---|---|---|---|---|
| Division | C | Si | Mn | P | S | Al | Ti |
| Galvanized steel material | 0.06 | 0.06 | 0.90 | 0.010 | 0.002 | 0.025 | 0.01 |

In Table 1 above, the remaining components are Fe and inevitable impurities.

TABLE 2

| | | Alloy composition of wire (weight %) | | | | | | | | | | | | Relational expression 1 | Relational expression 2 |
|---|---|---|---|---|---|---|---|---|---|---|---|---|---|---|---|
| Division | No. | C | Si | Mn | P | S | Cu | Ni | Ti | Cr | Mo | Al | B | | |
| Inventive example | 1 | 0.07 | 0.060 | 1.68 | 0.011 | 0.003 | 0.16 | 0.29 | 0.072 | 0.019 | 0.003 | 0.006 | 0.005 | 3.6 | 0.08 |
| | 2 | 0.08 | 0.090 | 1.72 | 0.010 | 0.007 | 0.17 | 0.25 | 0.078 | 0.032 | 0.005 | 0.012 | 0.002 | 5.2 | 0.09 |
| | 3 | 0.07 | 0.080 | 1.75 | 0.007 | 0.005 | 0.15 | 0.01 | 0.056 | 0.027 | 0.004 | 0.014 | — | 4.6 | 0.07 |
| | 4 | 0.08 | 0.050 | 2.45 | 0.009 | 0.008 | 0.19 | 0.40 | 0.047 | 0.015 | 0.002 | 0.013 | — | 2.0 | 0.06 |
| | 5 | 0.07 | 0.072 | 1.73 | 0.012 | 0.006 | 0.18 | 0.02 | 0.001 | 0.043 | 0.007 | 0.008 | 0.003 | 4.2 | 0.01 |
| Comparative example | 1 | 0.09 | 0.025 | 1.68 | 0.008 | 0.006 | 0.25 | 0.37 | 0.097 | 0.020 | 0.007 | 0.006 | 0.003 | 1.5 | 0.10 |
| | 2 | 0.07 | 0.046 | 1.66 | 0.002 | 0.004 | 0.18 | 0.29 | 0.098 | 0.016 | 0.003 | 0.021 | 0.003 | 2.8 | 0.12 |
| | 3 | 0.07 | 0.035 | 1.79 | 0.003 | 0.005 | 0.18 | 0.00 | 0.120 | 0.016 | 0.008 | 0.035 | 0.003 | 2.0 | 0.16 |
| | 4 | 0.10 | 0.022 | 1.49 | 0.004 | 0.006 | 0.28 | 0.01 | 0.160 | 0.026 | 0.004 | 0.024 | 0.002 | 1.5 | 0.18 |
| | 5 | 0.05 | 0.130 | 2.04 | 0.005 | 0.004 | 0.26 | 0.01 | 0.190 | 0.030 | 0.003 | 0.014 | — | 6.4 | 0.20 |
| | 6 | 0.10 | 0.240 | 1.80 | 0.009 | 0.008 | 0.20 | 0.03 | 0.056 | 0.018 | 0.006 | 0.016 | 0.003 | 13.3 | 0.07 |
| | 7 | 0.07 | 0.180 | 1.65 | 0.007 | 0.005 | 0.22 | 0.04 | 0.042 | 0.009 | 0.010 | 0.018 | 0.002 | 10.9 | 0.06 |
| | 8 | 0.08 | 0.150 | 2.50 | 0.010 | 0.007 | 0.17 | 0.25 | 0.078 | 0.020 | 0.005 | 0.012 | — | 6.0 | 0.09 |
| | 9 | 0.07 | 0.070 | 1.70 | 0.011 | 0.003 | 0.16 | 0.29 | 0.092 | 0.019 | 0.003 | 0.008 | 0.005 | 4.1 | 0.10 |
| | 10 | 0.08 | 0.080 | 1.85 | 0.010 | 0.007 | 0.17 | 0.25 | 0.076 | 0.032 | 0.005 | 0.074 | 0.002 | 4.3 | 0.15 |

In Table 2 above, the remaining components are Fe and inevitable impurities.

TABLE 3

| | | Porosity in weld zone (%) | | Fracture position in weld zone | |
|---|---|---|---|---|---|
| Division | No. | Ar + 10% CO$_2$ | Ar + 20% CO$_2$ | Ar + 10% CO$_2$ | Ar + 20% CO$_2$ |
| Inventive example | 1 | 0.0 | 0.0 | O | O |
| | 2 | 0.0 | 0.0 | O | O |

TABLE 3-continued

| | | Porosity in weld zone (%) | | Fracture position in weld zone | |
|---|---|---|---|---|---|
| Division | No. | Ar + 10% CO$_2$ | Ar + 20% CO$_2$ | Ar + 10% CO$_2$ | Ar + 20% CO$_2$ |
| | 3 | 0.0 | 0.0 | O | O |
| | 4 | 2.7 | 1.5 | O | O |
| | 5 | 0.0 | 0.0 | O | O |
| Comparative example | 1 | 33.1 | 10.0 | X | O |
| | 2 | 40.0 | 13.1 | X | X |
| | 3 | 24.6 | 9.2 | X | O |
| | 4 | 7.8 | 22.3 | O | X |
| | 5 | 19.2 | 18.5 | X | X |
| | 6 | 46.0 | 42.7 | X | X |
| | 7 | 44.2 | 41.8 | X | X |
| | 8 | 35.6 | 38.2 | X | X |
| | 9 | 9.9 | 15.7 | O | X |
| | 10 | 23.8 | 14.5 | X | X |

As shown in Tables 1 to 3 above, in Inventive Examples 1 to 5, satisfying both an alloy composition of a wire and Relational expressions 1 and 2, a length fraction occupied by pore defects, with respect to the entire length of the welding metal is 10% or less (including 0%), and furthermore, it can be seen that a fracture position in a weld zone is excellent as a welding base material or a heat-affected zone.

In this regard, Comparative Examples 1 and 4 and 5 illustrate cases in which Relational expressions 1 and 2 are outside the scope of the present disclosure, and it can be confirmed that a high porosity in a weld zone is shown in one protective gas, or a high porosity in a weld zone is shown in all protective gases, and as a result, it can be confirmed that a fracture position of the weld zone also occurs in the welding metal.

In addition, in Comparative Examples 2 and 3 and 9 and 10 not satisfying Relational expression 2, a high porosity in a weld zone is shown in one protective gas, or a high porosity in a weld zone is shown in all protective gases, and as a result, a fracture position in the weld zone also occurs in the welding metal.

Comparative Examples 6 to 8 illustrate a case in which Relational expression 1 is not satisfied, and a high porosity in a weld zone is shown in all protective gases, and as a result, it can be confirmed that a fracture position in the weld zone also occurs in the welding metal.

Figure 2:
FIG. 2 is a photograph illustrating the appearance of a weld bead and the results of an X-ray analysis when forming welding metal using the welding wire in Comparative Example 2 in an embodiment of the present disclosure.

Meanwhile, FIG. 1 is a photograph illustrating the appearance of a weld bead and the results of an X-ray analysis when forming a welding metal using the welding wire of Inventive Example 1 in an embodiment of the present disclosure. FIG. 2 is a photograph illustrating the appearance of a weld bead and the results of an X-ray analysis when forming a welding metal using the welding wire of Comparative Example 2 in an embodiment of the present disclosure.

The invention claimed is:

1. A gas shielded arc welding wire, comprising by weight %:

0.001 to 0.30% of C; 0.25% or less of Si (excluding 0%); 0.50 to 3.00% of Mn; 0.030% or less of P (excluding 0%); 0.030% of less of S (excluding 0%); 0.50% or less of Cr (excluding 0%); 0.60% or less of Mo (excluding 0%); less than 0.10% of Al (excluding 0%); 0.40% or less of Ni (excluding 0%); 0.50% or less of Cu (excluding 0%); less than 0.10% of Ti (excluding 0%), with a balance of Fe and other unavoidable impurities, the wire satisfying relational expression 1 and relational expression 2, $$2.0 \leq [Si] \times 100/[Mn] \leq 5.2 \qquad \text{[Relational expression 1]}$$

$$[Ti] + [Al] < 0.10 \qquad \text{[Relational expression 2]}$$

in Relational expression 1 and Relational expression 2 above, [Si], [Mn], [Ti], and [Al] represent a weight percent content of each element in parentheses for the welding wire.

2. The gas shielded arc welding wire of claim 1, wherein the welding wire includes Si in the range of 0.05 to 0.09%.

3. The gas shielded arc welding wire of claim 1, wherein the welding wire further includes at least one of 0.10% or less of Nb, 0.10% or less of V, and 0.10% or less of Zr.

4. The gas shielded arc welding wire of claim 1, wherein the welding wire further includes 0.01% or less of B.

5. The gas shielded arc welding wire of claim 1, wherein the welding wire is a solid wire, a metal cored wire, or a flux cored wire.

6. A welding metal obtained by welding a welding base material using the welding wire of claim 1, wherein the welding metal has a length fraction occupied by pore defects of 10% or less (including 0%), with respect to the entire length of the welding metal.

7. The welding metal of claim 6, wherein the welding base material is a hot-dip galvanized steel sheet having a hot-dip galvanized layer formed on the surface.

8. The welding metal of claim 6, wherein the welding base material comprises, by weight:

0.04 to 0.18% of C, 2.0% or less of Si (including 0%); 0.5 to 3.0% of Mn, 2.0% or less of Cr (including 0%), 2.0% or less of Mo (including 0%), 0.01 to 0.1% of Al, 0.05% or less of P (excluding 0%), 0.05% or less of S (excluding 0%), with a balance of Fe and other unavoidable impurities.

9. The welding metal of claim 8, wherein the welding base material further comprises at least one of 0.20% or less of Ti, 0.10% or less of Nb, and 0.10% or less of Cu.

10. The welding metal of claim 6, wherein the welding base material has a thickness of 0.8 to 4.0 mm.

* * * * *